United States Patent [19]

Keough

[11] Patent Number: 5,034,985

[45] Date of Patent: Jul. 23, 1991

[54] MATCHED MAILING SYSTEM EMPLOYING ADDRESS PRINT ARRAY RECOGNITION

[75] Inventor: Laurence J. Keough, Fairfield, Conn.

[73] Assignee: Pitney Bowes Inc., Stamford, Conn.

[21] Appl. No.: 434,732

[22] Filed: Nov. 13, 1989

[51] Int. Cl.[5] .............................................. G06K 9/00

[52] U.S. Cl. .............................................. 382/1; 382/8; 382/7; 364/400; 235/462; 235/383; 209/584; 209/900

[58] Field of Search ........................ 382/1, 8, 7, 40, 48; 235/383, 462, 56; 364/401, 400; 209/900, 585, 584; 53/209, 266 A, 569, 55, 206, 498, 499

[56] References Cited

U.S. PATENT DOCUMENTS

| | | | |
|---|---|---|---|
| 4,034,341 | 7/1977 | Isono et al. | 382/1 |
| 4,158,835 | 6/1979 | Miura et al. | 382/1 |
| 4,201,978 | 5/1980 | Nally | 340/146.3 |
| 4,429,217 | 1/1984 | Hill et al. | 53/206 |
| 4,516,264 | 5/1985 | Corvari et al. | 382/1 |
| 4,524,453 | 6/1985 | Egami et al. | 382/1 |
| 4,525,986 | 7/1985 | Noll | 53/266 A |
| 4,547,896 | 10/1985 | Ohtombe | 382/7 |
| 4,547,899 | 10/1985 | Nally | 382/7 |
| 4,632,252 | 12/1986 | Haruki et al. | 382/1 |
| 4,641,753 | 2/1987 | Tamada | 382/1 |
| 4,791,281 | 12/1988 | Johnsen et al. | 235/383 |
| 4,796,196 | 1/1989 | Durst et al. | 209/584 |
| 4,800,505 | 1/1989 | Axelrod et al. | 209/584 |
| 4,805,382 | 2/1989 | De Pasquale et al. | 53/266 A |
| 4,897,795 | 1/1990 | Yoda et al. | 382/8 |
| 4,903,456 | 2/1990 | Meur | 53/266 A |

*Primary Examiner*—Michael Razavi
*Attorney, Agent, or Firm*—Charles R. Malandra, Jr.; David E. Pitchenik; Melvin J. Scolnick

[57] ABSTRACT

A system for match mailing a plurality of documents and envelopes, includes first scanning means for scanning at least one line of a first identification block of text printed on a document, the first block of text having a determined number of characters, first means operatively connected to the first scanning means for generating a first print array representative of the number and location of characters of the lines scanned in the first block of text, second scanning means for scanning at least one line of a second identification block of text printed on an envelope, the second block of text having a determined number of characters and second means operatively connected to the second scanning means for generating a second print array representative of the number and location of characters of the lines scanned in the second block of text. The system may further include means for comparing the first print array to the second print array and inserting means operatively connected to the comparing means for inserting the document into the envelope when the first print array matches the second print array.

14 Claims, 7 Drawing Sheets

FIG. 2

| | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 |
|---|---|---|---|---|---|---|---|---|---|---|---|---|---|---|---|---|---|---|---|---|---|---|---|---|---|
| 201 | M<br>6<br>F | R<br>4<br>A | .<br><br>I | <br>W<br>R | C<br>O<br>F | H<br>O<br>I | R<br>D<br>E | I<br>L<br>L | S<br>A<br>D | T<br>W<br>, | O<br>N<br> | P<br><br>C | H<br>A<br>T | E<br>V<br>. | R<br>E<br> | <br>.<br>0 | J<br><br>6 | O<br><br>3 | N<br><br>3 | E<br><br>0 | S | | | | |
| 202 | M<br>1<br>F | R<br>2<br>A | .<br>0<br>I | <br><br>R | L<br>W<br>F | A<br>O<br>I | R<br>O<br>E | R<br>D<br>L | Y<br>B<br>D | <br>R<br>, | S<br>I<br> | M<br>D<br>C | I<br>G<br>T | T<br>E<br>. | H | <br>L<br>0 | <br>A<br>6 | <br>N<br>3 | <br>E<br>3 | <br><br>0 | | | | | |
| 203 | M<br>1<br>F | R<br>3<br>A | .<br>2<br>I | <br><br>R | H<br>W<br>F | A<br>O<br>I | R<br>O<br>E | R<br>D<br>L | Y<br>B<br>D | <br>R<br>, | B<br>I<br> | O<br>D<br>C | L<br>G<br>T | E<br>E<br>. | S | <br>L<br>0 | <br>A<br>6 | <br>N<br>3 | <br>E<br>3 | <br><br>0 | | | | | |
| 204 | P<br>4<br>F | A<br>0<br>A | T<br>1<br>I | <br><br>R | B<br>S<br>F | A<br>H<br>I | S<br>O<br>E | K<br>R<br>L | E<br>T<br>D | R<br><br>, | V<br>T<br> | I<br>U<br>C | L<br>R<br>T | L<br>N<br>. | E | <br>L<br>0 | <br>A<br>6 | <br>N<br>3 | <br>E<br>3 | <br><br>0 | | | | | |

FIG. 4

| CHANNEL | PRINT ARRAY 301 | PRINT ARRAY 302 | PRINT ARRAY 303 | PRINT ARRAY 304 |
|---|---|---|---|---|
| 101 | 1, 2, 3 | 1, 2, 3 | 1, 2, 3 | 1, 2, 3 |
| 102 | 1, 2, 3 | 1, 2, 3 | 1, 2, 3 | 1, 2, 3 |
| 103 | 1, 3 | 1, 2, 3 | 1, 2, 3 | 1, 2, 3 |
| 104 | 2, 3 | 3 | 3 | 3 |
| 105 | 1, 2, 3 | 1, 2, 3 | 1, 2, 3 | 1, 2, 3 |
| 106 | 1, 2, 3 | 1, 2, 3 | 1, 2, 3 | 1, 2, 3 |
| 107 | 1, 2, 3 | 1, 2, 3 | 1, 2, 3 | 1, 2, 3 |
| 108 | 1, 2, 3 | 1, 2, 3 | 1, 2, 3 | 1, 2, 3 |
| 109 | 1, 2, 3 | 1, 2, 3 | 1, 2, 3 | 1, 2, 3 |
| 110 | 1, 2, 3 | 2, 3 | 2, 3 | 1, 3 |
| 111 | 1, 2 | 1, 2 | 1, 2 | 1, 2 |
| 112 | 1, 3 | 1, 2, 3 | 1, 2, 3 | 1, 2, 3 |
| 113 | 1, 2, 3 | 1, 2, 3 | 1, 2, 3 | 1, 2, 3 |
| 114 | 1, 2, 3 | 1, 2, 3 | 1, 2, 3 | 1, 2, 3 |
| 115 | 1, 2 | 1 | 1 | 1 |
| 116 | 2, 3 | 2, 3 | 2, 3 | 2, 3 |
| 117 | 1, 3 | 2, 3 | 2, 3 | 2, 3 |
| 118 | 1, 3 | 2, 3 | 2, 3 | 2, 3 |
| 119 | 1, 3 | 2, 3 | 2, 3 | 2, 3 |
| 120 | 1, 3 | 3 | 3 | 3 |
| 121 | 1 | | | |
| 122 | | | | |
| 123 | | | | |
| 124 | | | | |
| 125 | | | | |

FIG. 5

| CHANNEL | 401 | 402 | 403 | 404 |
|---|---|---|---|---|
| 101 | 3 | 3 | 3 | 3 |
| 102 | 3 | 3 | 3 | 3 |
| 103 | 2 | 3 | 3 | 3 |
| 104 | 2 | 1 | 1 | 1 |
| 105 | 3 | 3 | 3 | 3 |
| 106 | 3 | 3 | 3 | 3 |
| 107 | 3 | 3 | 3 | 3 |
| 108 | 3 | 3 | 3 | 3 |
| 109 | 3 | 3 | 3 | 3 |
| 110 | 3 | 2 | 2 | 2 |
| 111 | 2 | 2 | 2 | 2 |
| 112 | 2 | 3 | 3 | 3 |
| 113 | 3 | 3 | 3 | 3 |
| 114 | 3 | 3 | 3 | 3 |
| 115 | 2 | 1 | 1 | 1 |
| 116 | 2 | 2 | 2 | 2 |
| 117 | 2 | 2 | 2 | 2 |
| 118 | 2 | 2 | 2 | 2 |
| 119 | 2 | 2 | 2 | 2 |
| 120 | 2 | 1 | 1 | 1 |
| 121 | 1 | 0 | 0 | 0 |
| 122 | 0 | 0 | 0 | 0 |
| 123 | 0 | 0 | 0 | 0 |
| 124 | 0 | 0 | 0 | 0 |
| 125 | 0 | 0 | 0 | 0 |

FIG. 6

| 501 | 502 | 503 | 504 |
|---|---|---|---|
| 1-21<br>2-16<br>3-20 | 1-15<br>2-19<br>3-20 | 1-15<br>2-19<br>3-20 | 1-15<br>2-19<br>3-20 |

FIG. 7

| | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 |
|---|---|---|---|---|---|---|---|---|---|---|---|---|---|---|---|---|---|---|---|---|---|---|---|---|---|
| 202 | M | R | . | | L | A | R | R | Y | | S | M | I | T | H | | | | | | | | | | |
| | 1 | 2 | 0 | | W | O | O | D | B | R | I | D | G | E | | L | A | N | E | | | | | | |
| | F | A | I | R | F | I | E | L | D | , | | C | T | . | | 0 | 6 | 3 | 3 | 0 | | | | | |
| 203 | M | R | . | | H | A | R | R | Y | | B | O | L | E | S | | | | | | | | | | X |
| | 1 | 3 | 2 | | W | O | O | D | B | R | I | D | G | E | | L | A | N | E | | | | | | |
| | F | A | I | R | F | I | E | L | D | . | | C | T | . | | 0 | 6 | 3 | 3 | 0 | | | | | |

FIG. 8

| CHANNEL | PRINT ARRAY 302 | PRINT ARRAY 303 |
|---|---|---|
| 101 | 1, 2, 3 | 1, 2, 3 |
| 102 | 1, 2, 3 | 1, 2, 3 |
| 103 | 1, 2, 3 | 1, 2, 3 |
| 104 | 3 | 3 |
| 105 | 1, 2, 3 | 1, 2, 3 |
| 106 | 1, 2, 3 | 1, 2, 3 |
| 107 | 1, 2, 3 | 1, 2, 3 |
| 108 | 1, 2, 3 | 1, 2, 3 |
| 109 | 1, 2, 3 | 1, 2, 3 |
| 110 | 2, 3 | 2, 3 |
| 111 | 1, 2 | 1, 2 |
| 112 | 1, 2, 3 | 1, 2, 3 |
| 113 | 1, 2, 3 | 1, 2, 3 |
| 114 | 1, 2, 3 | 1, 2, 3 |
| 115 | 1 | 1 |
| 116 | 2, 3 | 2, 3 |
| 117 | 2, 3 | 2, 3 |
| 118 | 2, 3 | 2, 3 |
| 119 | 2, 3 | 2, 3 |
| 120 | 3 | 3 |
| 121 | | |
| 122 | | |
| 123 | | |
| 124 | | |
| 125 | | 1 |

MATCHED MAILING SYSTEM EMPLOYING ADDRESS PRINT ARRAY RECOGNITION

FIELD OF THE INVENTION

The present invention relates to matched mailing systems, and more particularly, to matched mailing systems employing address characteristics for matching mailing envelopes and inserts. The present invention can be utilized in inserting machines where the inserter processes other materials which may require matching or match verification before being inserted into envelopes.

BACKGROUND OF THE INVENTION

Systems have been developed for matched mailing. Matched mailing as defined herein means that items to be inserted into an envelope are matched with a particular envelope or with other documents. These matched mailings are used, for example, in connection with inserting pre-identified coupons into pre-determined envelopes such that usage patterns of recipients of a mailing can be determined by how the particular coupons are redeemed. Matched mailing systems are also employed where a particular insert such as a letter is to be inserted into an opaque envelope (that is where the inserted letter does not serve as the address bearing document which is visible through a windowed portion of the envelope).

One known method for accomplishing matched mailings has involved the use of relatively expensive optical character recognition (OCR) devices. The name and address on the envelope is read and compared with the name and address on the insert which is also read to insure that the appropriate match exists. OCR devices usually include a scanner for digitizing printed characters, and a computer which executes algorithms for character recognition of the scanned characters. The various types of algorithms include preprocessing algorithms, such as line segmentation, character segmentation, and character recognition algorithms, such as template matching, are well known in the art. In general, the template matching algorithm, in which a scanned character is correlated with templates of all expected characters, is time consuming and normally executed in hardware, which results in expensive systems.

Other known methods of achieving matched mailing involve keeping a track of the location of both the envelope and the insert as the envelope and insert are processed by the system. Another method involves an on-line fabrication of the envelope such that a match is automatically guaranteed. Yet another method involves an on-line address printing on the envelope immediately prior to insertion. These methods are either very costly or are subject to errors.

In U.S. patent application Ser. No. 176,803, filed Apr. 1, 1988, having the same inventor and assignee as the present application, a method and apparatus for matching uniquely identified documents to an envelope using a plurality of bar code readers is disclosed. A bar code reader is mounted on each of the feeder hoppers of an inserter system for the purpose of reading bar code information printed on each document fed onto a transport deck.

SUMMARY OF THE INVENTION

A system has been discovered that will provide a matched mailing capability without the need to have optical character recognition devices which read the address on the documents to be inserted and on the mail piece and without the need to keep track of the location of the mailpiece and inserts.

In accordance with the present invention, a matched mailing system utilizes a print array of the address on the address bearing document for performing the matching function. The print array serves as a code which is distinct and easily matched to an identical print array code of another document to be matched.

The system in accordance with the present invention increases the speed and effectiveness of a matched mailing system and the reliability of insuring a proper match is accomplished, while utilizing relatively inexpensive optical reading devices. The present invention eliminates the need for the template matching or other character recognition algorithms in a matched mailing system.

In accordance with a further feature of the present invention consecutive documents containing addresses having identical print arrays are modified so that a detectable difference exists and the addresses occupy different print arrays.

A system embodying the present invention includes first scanning means for scanning at least one line of a first identification block of text printed on a document, the first block of text having a determined number of characters, first means operatively connected to the first scanning means for generating a first print array representative of the number and location of characters of the lines scanned in the first block of text, second scanning means for scanning at least one line of a second identification block of text printed on an envelope, the second block of text having a determined number of characters and second means operatively connected to the second scanning means for generating a second print array representative of the number and location of characters of the lines scanned in the second block of text.

The system may further include means for comparing the first print array to the second print array and inserting means operatively connected to the comparing means for inserting the document into the envelope when the first print array matches the second print array.

BRIEF DESCRIPTION OF THE DRAWINGS

A complete understanding of the present invention may be obtained from the following detailed description of the preferred embodiment thereof, when taken in conjunction with the accompanying drawings, where like reference numerals designate similar elements in the figures, and in which:

FIG. 2 is a chart showing four representative different addresses, each oriented as an array which would be printed on mail pieces and envelopes and scanned by the system in FIG. 1.

FIG. 4 is a chart showing the print arrays of the addresses shown in FIG. 2, generated in accordance with the preferred embodiment of the present invention.

FIG. 5 is chart showing different print arrays for the addresses shown in FIG. 2, generated using an alternate pattern technique.

FIG. 6 is a chart showing other print arrays for the addresses shown FIG. 2, generated using another alternate pattern technique.

FIG. 7 is a chart showing the representative addresses in FIG. 2, modified to avoid consecutive mail pieces in any mailing having identical print arrays.

FIG. 8, is a chart showing the print arrays of the addresses shown in FIG. 6, generated in accordance with the preferred embodiment of the present invention.

DETAILED DESCRIPTION OF THE PREFERRED EMBODIMENT

Figure 1:
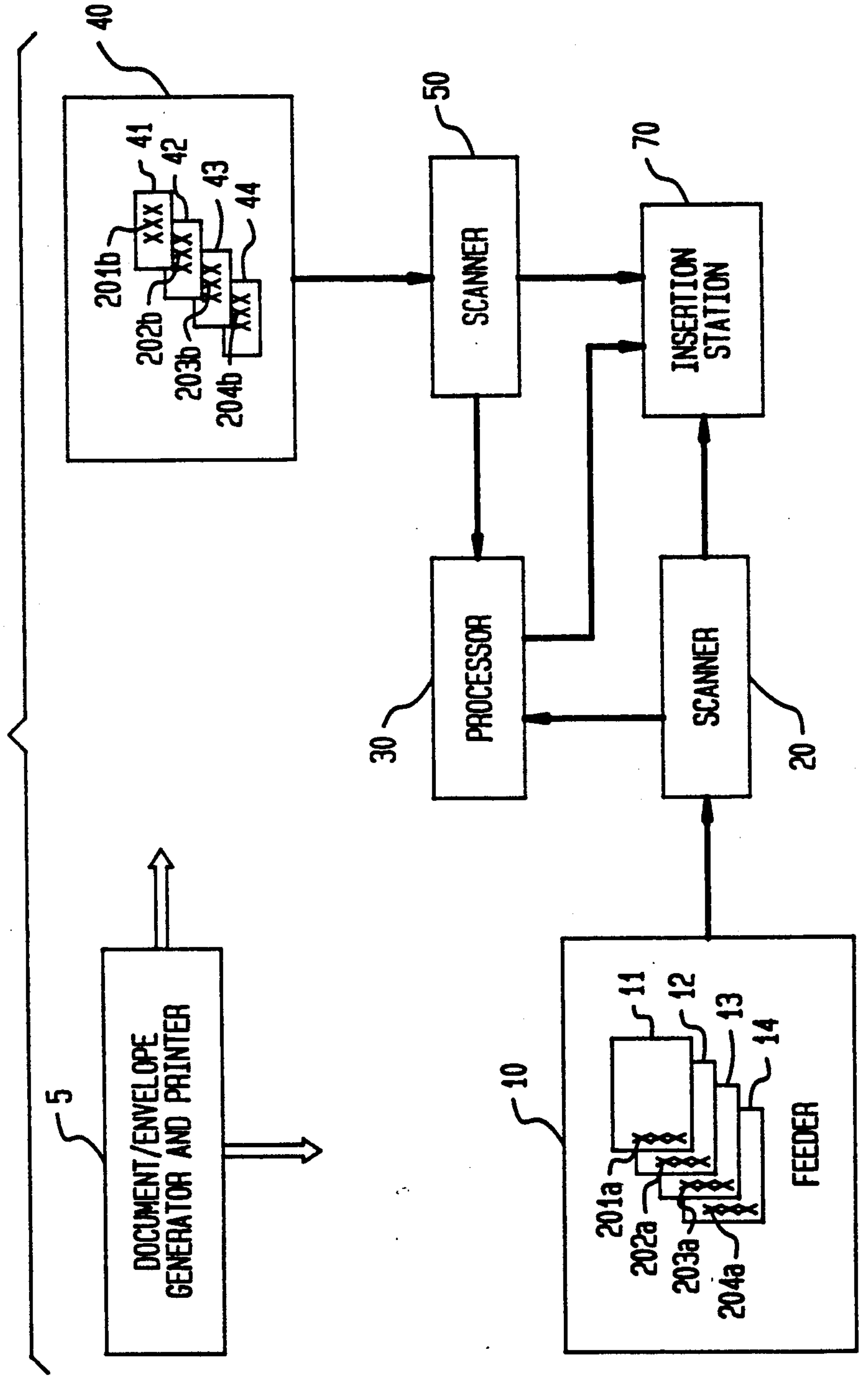
FIG. 1 is a block diagram of a matched mailing system embodying a print array matching technique of the present invention.

In FIG. 1, a block diagram of the present invention is shown. Document/envelope generator and printer 5 generates and prints documents, such as those shown at 11, 12, 13, and 14, each containing an identification block of text such as addresses 201*a*, 202*a*, 203*a* and 204*a*. Document/envelope generator and printer 5 also generates and prints envelopes, such as those shown at 41, 42, 43 and 44, each containing an identification block of text which corresponds to the block of text on documents 11, 12, 13 and 14, such as addresses 201*b*, 202*b*, 203*b* and 204*b*. Once generated and printed, documents 11, 12, 13, and 14 are placed in feeder 10 and envelopes 41, 42, 43 and 44 are placed in feeder 40. It will be appreciated that document/envelope generator and printer 5 can be two devices, one for documents and one for envelopes, which communicate in a known manner. It is envisioned that document/envelope generator and printer 5 would be a convention computer system capable of generating the printed documents and envelopes, for example a mini computer and laser printer configuration.

Feeder 10 feeds documents, 11, 12, 13, and 14, which are sequentially transported to document scanner 20. When document 11 is transported to scanner 20, scanner 20 scans an area containing mailing address 201*a* on document 11. Feeder 40 feeds envelopes 41, 42, 43, and 44, which are sequentially transported to envelope scanner 50. As document 11 is transported to scanner 20, envelope 41 is transported to scanner 50. Scanner 50 scans an area containing mailing address 201*b* printed on envelope 41. The scanned information read by scanners 20 and 50 are sent to processor 30 which generates two print arrays (described below) one for the mailing address on document 11 and another for the mailing address on envelope 41. Envelope 41 and document 11 are transported to insert station 70. If the print array of document 11 matches the print array of envelope 41, document 11 is inserted into the envelope 41. If the print arrays do not match, document 11 and/or envelope 41 can be rejected automatically.

As stated previously, each of documents 11, 12, 13 and 14 and envelopes 41, 42, 43, and 44 has therein a block of text, such as a mailing address 201*a* for document 11 and mailing address 201*b* for envelope 41. The mailing addresses, for example, addresses 201, 202, 203, and 204 shown in FIG. 2, which respectively correspond to 201*a*, 202*a*, 203*a*, 204*a* and to 201*b*, 202*b*, 203*b* and 204*b*, occupy a fixed location and a predetermined amount of space. The number and location of characters in each line of addresses 201 *a* and *b* can be used to distinguish addresses 201 *a* and *b* from addresses 202 *a* and *b*, 203 *a* and *b*, and 204 *a* and *b*. For example, the name Mr. Christopher Jones in address 201 is distinguishable from Mr. Larry Smith in address 202 because of the extra amount of characters in the longer name. In addition, the location of the characters provides another level of distinguishability. In the preferred embodiment of the present invention, the entire address is scanned to obtain a print array representative of the address.

In the preferred embodiment, scanner 20 includes an image scanner, such as a CCD based array available from Texas Instruments or a MOS based array available from RETICON, and a single board computer, such as a computer based on INTEL processor 80286. Scanner 20 is used in the present invention to determine the print array of an identification block of text, such as a mailing address. Unlike other matched mailing systems requiring more expensive readers to recognize the characters in the address, the present invention does not use a time consuming template matching algorithm required for the recognition of the address characters. The present invention must only distinguish between the presence and absence of characters in the address. This is accomplished by adjusting the position of scanner 20 to correspond to the location of the block of text on the document being scanned. FIG. 3*b*, described below, provides a flow .chart showing the conversion of the scanned address into a print array.

Referring now to FIG. 2, an example of the scanning of addresses is shown. Addresses 201, 202, 203 and 204 represent mailing addresses 201*a*, 202*a*, 203*a*, and 204*a* printed on documents 11, 12, 13, and 14 respectively and mailing addresses 201*b*, 202*b*, 203*b* and 204*b* printed on envelopes 41, 42, 43, and 44 respectively. As document 11 passes by scanner 20, scanner 20 scans each line of address 201*a*. In accordance with the present invention for each block of text, such as address 201*a*, scanner 20 divides the scanned information into a plurality of channels. The number of channels are determined based on the number of characters in the identification block of text generated by document/envelope generator and printer 5 (FIG. 1). In FIG. 2, channels 101 through 125 are shown. For each channel, scanner 20 records the line number when a character is detected in that channel. The same information is scanned and recorded when envelope 41 passes by scanner 50. For purposes of illustration, in FIG. 2 each channel contains only one character or character space. Normally, the scanned characters will overlap channels and the lines may be skewed. The line segmentation (for deskewing the lines) and the character segmentation (for separating the characters) are handled by algorithms which are known to those skilled in the art.

For addresses 201 *a* and *b*, scanners 20 and 50 scan at least one line, such as the name Mr. Christopher Jones. Scanners 20 and 50 detect the characters printed in channels 101, 102, 103, 105 through 115, and 117 through 121. In the examples provided in FIG. 2, all the addresses are left justified. It will be understood that this is not a requirement for the present invention. In the preferred embodiment, the mailing address format, i.e. the positions and spacing, of the characters in the document addresses, such as 201*a*, 202*a*, 203*a*, and 204*a* are consistent with the format of the characters in the envelope addresses, such as 201*b*, 202*b*, 203*b* and 204*b*.

Figure 3A:
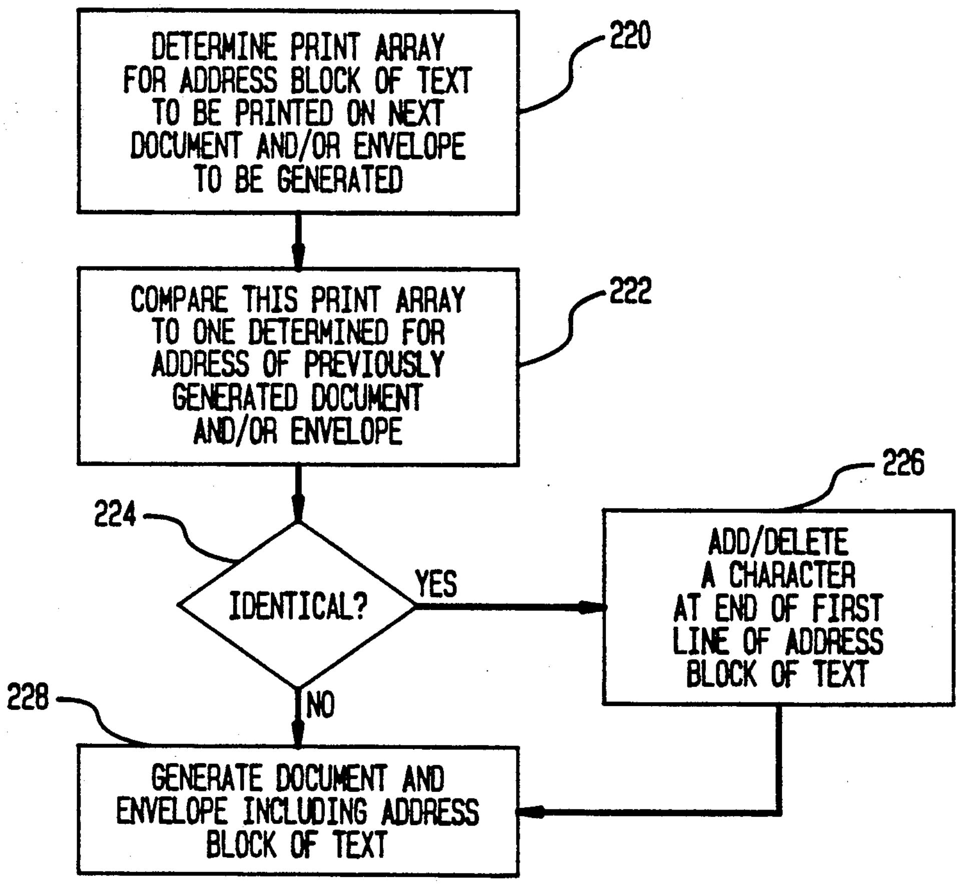
FIG. 3*a*, is a flowchart showing the generation of a document and an envelope by the system in FIG. 1.
Figure 3B:
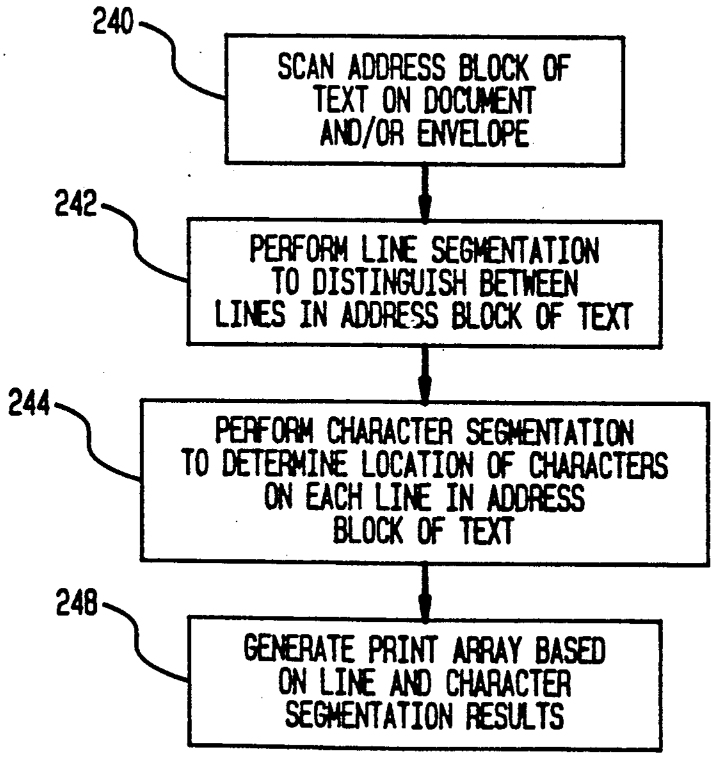
FIG. 3*b*, is a flowchart showing the scanning of an address and the generation of a print array.

Referring now to FIG. 3*a*, a flowchart describing the generation of a document and/or envelope in the preferred embodiment of the present invention, is shown.

Steps 220 through 228 are performed by the Generator and Printer 5 in FIG. 1. At 220, the print array for an address block of text to be printed on the next document and/or envelope to be generated is determined. At 222, a comparison of this print array is made to the print array determined for the previously generated document and/or envelope. At 224, if the arrays are not identical, the document and or envelope are generated, at 228, with the address block of text. If the arrays are identical at 224, a character is added or deleted, at 226, at the end of the first line of the address block of text. For example, a character will be added if there is no character present at the end of the first line of the original address block of text, and will be deleted if a character is present. At 228, the modified address block of text will be printed on the document and/or envelope. Through this process, no consecutive generated documents or envelopes can have identical print arrays.

Referring now to FIG. 3*b*, a flowchart describing the generation of a print array for an address is shown. At 240, the address block of text on a document and/or and envelopes is scanned. At 242, line segmentation is performed on the scanned information to distinguish between the lines in the address block of text. At 244, character segmentation is performed to determine the location of each character on each line of the address block of text. At 248, a print array is generated based on the results of the line and character segmentations.

As each line of mailing addresses 201 *a* and *b* are scanned, scanners 20 and 50 detect the presence or absence of a character in each channel. The outputs from the scanners 20 and 50 are on/off or black/white patterns representing where characters are located in each line of addresses 201 *a* and *b*. Scanners 20 and 50 transmit the outputs to processor 30 which generates print array 301, shown in FIG. 4, for each of mailing addresses 201 *a* and *b*. FIG. 3 also shows print arrays 302, 303, and 304, corresponding to mailing addresses 202, 203, and 204, respectively, in FIG. 2.

It will be appreciated that the matching can also be accomplished by matching the print array generated from only one line of a mailing address, such as the line containing the name. In the preferred embodiment of the present invention, the entire address is scanned to obtain a print array representative of the entire address. Generating a print array from all lines of the mailing address significantly increases the probability that two consecutively scanned mailing addresses will result in different print arrays.

Referring now to FIG. 4, examples of a print array generated from a scan of an address block are shown. Print arrays 301, 302, 303, and 304 correspond to addresses 201, 202, 203, and 204 respectively. The left column identifies the array channels 101-125 of document scanner 20 and envelope scanner 50. Print array 301 represents the print array generated by processor 30 according to information received from document scanner 20, relating to the scanning of mail address 201 printed on document 11. Print array 301 also represents the print array generated by processor 30 after receiving information from envelope scanner 50, relating to the scanning of mailing address 201 printed on envelope 41. In the preferred embodiment, each of the array channels identifies every line containing a character in that channel. From print array 301, it can be seen that the scanners 20 and 50 detected characters in lines 1, 2 and 3 for channels 101, 102, 105 through 110, 112, 113 and 114. Characters were detected in only lines 2 and 3 for channels 104 and 116, in only lines 1 and 3 for channels 103, 112 and 117 through 120, in only lines 1 and 2 for channels 111 and 115, in only line 3 for channels 17 through 20, and in only line 1 for channel 121. No characters were detected in channels 122 through 125.

Thus referring back to FIG. 1, when document 11 containing address 201 is to be inserted into envelope 41 containing address 201, the print array generated by processor 30 for document 11 will match the print array generated by processor 30 for envelope 41, document 11 and envelope 41 will be transported to insert station 70 and document 11 will be inserted into envelope 41. No insertion will occur if the system attempted to insert document 12 containing address 202 into envelope 41 because print array 302 for document 12 and print array 301 for envelope 41 do not match. When the print arrays of a document and an envelope do not match an error is detected and appropriate steps can be taken, for example, rejection of the document and envelope or operator intervention.

FIGS. 5 and 6 show other print arrays which can be generated for addresses 201, 202, 203 and 204 using alternate pattern techniques. In FIG. 5, print arrays 401, 402, 403 and 404 correspond to addresses 201, 202, 203 and 204 respectively using a pattern technique where the number of address lines containing characters in each channel is recorded per channel. This differs from the pattern technique used in the preferred embodiment shown in FIG. 4, which records the lines in which the characters were detected for each channel.

In FIG. 6, print arrays 501, 502, 503, and 504 correspond to addresses 201, 202, 203 and 204 respectively using a pattern technique where the last channel containing a character in each line is recorded.

It will be understood by those skilled in the art that additional techniques can be used to generate print arrays. The pattern technique used to generate the print arrays in FIG. 4 is a preferred technique because it contains more information per channel and is less likely to have two consecutive documents/envelopes with identical print arrays. For example, print arrays 403 and 404 are identical, but print arrays 303 and 304 are not. This is because the pattern technique used in the preferred embodiment shown in FIG. 4 contains more character pattern information per channel. Print arrays 303 and 304 differ at channel 110 because the preferred pattern technique has a higher level of discriminating power which makes it better suited for use in matched mailing in accordance with the present invention.

As described thus far, it will be appreciated that is possible for the print arrays for a document and an envelope to match even when the scanned mailing addresses of each are different. An example of this is when consecutive documents bearing addresses 202 and 203 in FIG. 2 are to be inserted into consecutive envelopes bearing addresses 202 and 203. Print arrays 302 and 303 for addresses 202 and 203 are identical. An error could occur in the matching of the print arrays, if for example, envelope 42 bearing address 202 is lost or out of sequence. When document 12 bearing address 202 is scanned print array 302 will be generated. Since envelope 42 containing the matching address is not in proper sequence, the system will attempt to match the next envelope, i.e. envelope 43 containing address 203. Because address 203 has an identical print array 303, the system, as described so far, would not detect an error and would insert document 12 into the envelope 43. In the preferred embodiment of the present invention, no print arrays of consecutive documents or envelopes are identical.

Referring now to FIG. 7, addresses 202 and 203 are shown again with one modification. An additional character has been added in channel 125 in the first line of address 203. In FIG. 8 print array 303 reflects the additional character in channel 125. The addition of this one character prevents consecutive addresses 202 and 203 from having identical print arrays. The additional character preferably is added when the document and envelope bearing address 203 are printed by document/envelope generator and printer 5 (FIG. 1). This requires that the print array for each address be known or determined by generator and printer 5. Because generator and printer 5 prints the documents and envelopes in the order they will be scanned and inserted, generator and printer 5, knowing the print arrays for each address, can prevent two consecutive printed documents/envelopes from having identical print arrays by adding at least one character to at least one line of the address, preferably at the end of a line. Alternatively, at least one character could be dropped from any of the lines of the address to prevent two consecutive addresses from having identical print arrays. The same technique can be used for alternate print arrays in FIGS. 5 and 6 to prevent consecutive identical print arrays.

The use of the print array algorithm in place of the character recognition algorithms significantly reduces the processing cost required for matched mailing. As described above, the matching of print arrays is reliable for matching inserts to envelopes.

While the invention has been disclosed and described with reference to a single embodiment thereof it will be apparent, as noted above that variations and modifications may be made therein. It is, thus, intended in the following claims to cover each variation and modification that falls within the true spirit and scope of the present invention.

What is claimed is:

1. A system for match-mailing a plurality of documents and envelopes, each containing an identification block of text thereon, said documents and envelopes being fed through the system in a predetermined order comprising:

a) first scanning means for scanning at least one line of a first identification block of text printed on a document, said first block of text having a determined number of characters, b) first means operatively connected to said first scanning means for generating a first print array, said first print array comprising a pattern representative of the number and location of characters in the lines scanned in said first block of text;

c) second scanning means for scanning at least one line of a second identification block of text printed on an envelope, said second block of text having a determined number of characters, d) second means operatively connected to said second scanning means for generating a second print array, said second print array comprising a pattern representative of the number and location of characters in the lines scanned in said second block of text;

e) means for comparing said first print array to said second print array, and f) inserting means operatively connected to said comparing means for inserting said document into said envelope when said first print array matches said second print array.

2. The system according to claim 1 wherein said first identification block of text consists of a mailing name and address for said document and said second identification block of text consists of a mailing name and address for said envelope.

3. The system according to claim 1 further comprising rejection means for rejecting said document and envelope when said first print array does not match said second print array.

4. The system according to claim 3 further comprising a control means for controlling the scanning, rejecting and inserting of said documents and said envelopes.

5. The system according to claim 4 further comprising a means for ensuring that the print arrays generated for two consecutive documents and corresponding envelopes ar not identical.

6. The system according to claim 5 wherein said ensuring means consists of adding or deleting on character from at least one line of said first block of text when the print array for two consecutive documents and corresponding envelopes are identical.

7. The system according to claim 6 further comprising means for generating each of the documents and envelopes containing the identification block of text.

8. A system for match-mailing a plurality of documents and envelopes, each containing an address block of text thereon, said documents and envelopes being fed through the system in a predetermined order comprising:

a) first scanning means for scanning at least one line of an address printed on a document, said address having a determined number of characters, b) first means operatively connected to said first scanning means for generating a document print array, said document print array comprising a pattern representative of the number and location of characters in the address lines scanned on said document, c) second scanning means for scanning at least one line of an address printed on an envelope said address having a determined number of characters, d) second means operatively connected to said second scanning means for generating an envelope print array, said envelope print array comprising a pattern representative of the number and location of characters in the address lines scanned on said envelope, e) means for comparing said document print array to said envelope print array, and f) inserting means operatively connected to said comparing means for inserting said document into said envelope when said document print array matches said envelope print array.

9. A method of matching documents, each containing an identification block of text, comprising the steps of:

a) scanning in array format the block of text of a first document to determine a pattern of characters representative of the size of the block of text and the arrangement of characters in the block of text, b) generating a first print array corresponding to the scanned block of text of said first document, c) scanning in array format the block of text of a second document to determine a pattern of characters representative of the size of the block of text and the arrangement of characters in the block of text, d) generating a second print array corresponding to the scanned block of text of said second document.

e) comparing said first print array to said second print array to determine if the first and second documents contain the same block of text.

10. The method according to claim 9 comprising the further steps of:

f) rejecting the first or second document or both documents, if the first print array does not match the second print array.

11. The method according to claim 9, wherein the identification block of text is a name and address printed on first and second documents.

12. The system of claim 1, wherein said first and second print arrays comprise a pattern representative of the presence and absence of characters in each line of a block of text.

13. The system of claim 1, wherein said first and second print arrays comprise a pattern representative of the number of characters in each line of text.

14. The system of claim 1, wherein said first and second print arrays comprise a pattern representative of a last channel containing a printed character in each line of text.

* * * * *